(12) United States Patent
Park et al.

(10) Patent No.: US 9,328,195 B2
(45) Date of Patent: May 3, 2016

(54) METHOD FOR PREPARING A POLYESTER RESIN

(75) Inventors: Kyu-Tae Park, Seoul (KR); Yoo-Jin Lee, Seoul (KR); Jong-Ryang Kim, Gyeonggi-do (KR); Sin-Young Hwang, Gyeonggi-do (KR)

(73) Assignee: SK CHEMICALS CO., LTD., Gyeonggi-Do (KR)

( * ) Notice: Subject to any disclaimer, the term of this patent is extended or adjusted under 35 U.S.C. 154(b) by 0 days.

(21) Appl. No.: 13/142,837

(22) PCT Filed: Dec. 23, 2009

(86) PCT No.: PCT/KR2009/007715
§ 371 (c)(1),
(2), (4) Date: Jun. 29, 2011

(87) PCT Pub. No.: WO2010/077009
PCT Pub. Date: Jul. 8, 2010

(65) Prior Publication Data
US 2011/0269933 A1    Nov. 3, 2011

(30) Foreign Application Priority Data

Dec. 31, 2008   (KR) .......................... 10-2008-0138335

(51) Int. Cl.
*C08G 63/18*     (2006.01)
*C08G 63/692*    (2006.01)
*C08G 63/78*     (2006.01)
*C08G 63/82*     (2006.01)
*C08G 63/199*    (2006.01)
*C08G 63/00*     (2006.01)

(52) U.S. Cl.
CPC .......... *C08G 63/6924* (2013.01); *C08G 63/199* (2013.01); *C08G 63/78* (2013.01); *C08G 63/82* (2013.01)

(58) Field of Classification Search
CPC ........ C08G 63/82; C08G 63/84; C08G 63/87; C08G 63/6924; C08G 63/78; C08G 63/199
USPC .................................................. 528/286, 287
See application file for complete search history.

(56) References Cited

U.S. PATENT DOCUMENTS

| | | | |
|---|---|---|---|
| 5,674,801 A | 10/1997 | George | |
| 2004/0092703 A1* | 5/2004 | Germroth et al. | 528/298 |
| 2007/0149757 A1* | 6/2007 | Nakajima et al. | 528/274 |

FOREIGN PATENT DOCUMENTS

| | | |
|---|---|---|
| EP | 0550034 B1 | 7/1993 |
| JP | 10-279676 | 10/1998 |
| JP | 2005-120254 | 5/2005 |
| KR | 10/0181687 B1 | 5/1999 |
| KR | 10-2004-0036045 A | 4/2004 |
| KR | 10-2004-0083544 A | 10/2004 |
| KR | 10-0562462 B1 | 3/2006 |

* cited by examiner

*Primary Examiner* — Ling Choi
*Assistant Examiner* — Gennadiy Mesh
(74) *Attorney, Agent, or Firm* — Blakely Sokoloff Taylor & Zafman LLP

(57) ABSTRACT

Disclosed is a method for preparing a polyester resin, wherein phosphate additives are used in preparing polyester resin to improve the reactive property of the esterification reaction or transesterification, as well as the flame retardancy property and the color stability of a polyester resin. The method for preparing a polyester resin comprises the steps of: carrying out an esterification reaction and/or an ester exchange reaction of a diacid component and a diol component in a presence of phosphoric acid derivatives, wherein the diol component comprises a primary diol and isosorbide, and wherein a reaction time of the esterification reaction or the ester exchange reaction is reduced and the remaining rate of isosorbide in the main chain of the polyester resin is increased.

3 Claims, No Drawings

METHOD FOR PREPARING A POLYESTER RESIN

This is a non-provisional application claiming the benefit of International Application Number PCT/KR2009/007715 filed Dec. 23, 2009.

FIELD OF THE INVENTION

This invention relates to a method for preparing a polyester resin, and more particularly, to a method for preparing a polyester resin for improving reactivity of an esterification reaction or an ester exchange reaction, and flame resistance and color stability of the polyester resin, by using phosphoric acid derivatives in preparation of the polyester resin.

BACKGROUNDS OF THE INVENTION

Generally, a polyester resin which is prepared from an aromatic and an aliphatic dicarboxylic acid and an alkylene glycol of appropriate structure has good physical and chemical properties. Also, it is widely used as textiles, films, adhesives and so on, because of its solubility in conventional solvent, flexibility, high adhesion to a variety of materials, coating workability, and so on.

In the preparation of polyester resins, the ratio of each raw material in the main chain of the final polyester resin is changed according to the reactivity of each raw material in case of an esterification reaction or an ester exchange reaction. While the ratio of each raw material in the main chain of the final polyester resin is changed according to the evaporation degree of each raw material in case of a polycondensation reaction. Among the diol component represented by alkylene glycol, the reactivity of a secondary or a tertiary diol is lower than a primary diol, and the reactivity of a tertiary diol is lower than a secondary diol, therefore the remaining rate of the secondary and the tertiary diol is low in the main chain of the polyester resin.

A polyester resin of high molecular weight, for example, polyethyleneterephthalate sometimes has unexpected colors by catalyst residues such as manganese, zinc, iron, and molybdenum which are produced from a preparation process of terephtalic acid. U.S. Pat. No. 5,674,801 discloses a method for preparing polyethyleneterephthalate using a polymerization catalyst containing cobalt salts which is combined with aluminum chloride, hydroxy aluminum, acetic acid aluminum or hydroxy aluminum chloride. The above stated patent states a method of preparing a colorless or white final product by blocking a metal catalyst residue using a phosphoric acid. The method can block the metal catalyst residue through forming a heteropolyacid by combining lots of metal with a phosphoric acid in the strong acidic medium. However, there are some disadvantages in that the very strong phosphoric acid is used.

A polyester resin is burnt easily in contact with flame, therefore the usage as the adhesives for electronics, flame retardant paints and so on which need flame resistance, has been limited. When the polyester resin is forced to be used, it should be mixed with a lot of flame retardant. As the flame retardant, inorganic flame retardants such as antimony and metal hydrate and halogenated organic flame retardants are generally used. But these flame retardants have problems in that they generate toxic gas in their combustion, as well as cause troubles to the insulation and the storage stability which are needed for the composition of adhesives for electronics or the coating agent.

SUMMARY OF THE INVENTION

It is an object of the present invention to provide a method for preparing a polyester resin which can improve a flame resistance and color stability of the polyester resin.

It is another object of the present invention to provide a method for preparing a polyester resin which can reduce the reaction time and increase the remaining rate of a secondary and/or a tertiary diol in a polyester resin, by increasing an activity of an esterification reaction or an ester exchange reaction.

In order to achieve these objects, the present invention provides a method for preparing a polyester resin comprising the step of: carrying out an esterification reaction and/or an ester exchange reaction of a diacid component and a diol component in the presence of phosphoric acid derivatives selected from a group consisting of compounds represented by the following Formulas 1 to 3; and carrying out a polycondensation reaction for reaction product of the esterification and/or ester exchange reaction.

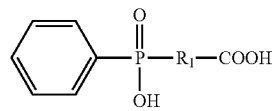

[Formula 1]

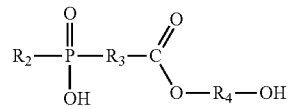

[Formula 2]

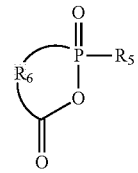

[Formula 3]

In Formula 1, $R_1$ is a linear, branched, mono-cyclic or multi cyclic saturated or unsaturated hydrocarbon group of 0 to 10 carbon atoms. In Formula 2, $R_2$ is a hydrogen atom or a linear saturated or unsaturated hydrocarbon group of 1 to 10 carbon atoms, $R_3$ and $R_4$ are independently a linear, branched, mono-cyclic or multi-cyclic saturated or unsaturated hydrocarbon group of 1 to 10 carbon atoms. In Formula 3, $R_5$ is a linear, branched, mono-cyclic or multi-cyclic saturated or unsaturated hydrocarbon group of 1 to 10 carbon atoms, and $R_6$ is a saturated or unsaturated hydrocarbon group of 1 to 10 carbon atoms.

In the present invention, the polyester resin is prepared in the presence of phosphoric acid derivatives selected from a group consisting of compounds represented by the above stated Formulas 1 to 3. Thus, the method for preparing a polyester resin of the present invention can increase the activity of an esterification reaction or an ester exchange reaction to reduce the reaction time and also increases the reactivity of a secondary or a tertiary diol of weak reactivity to increase the remaining rate of the secondary or the tertiary diol in the main chain of the finally polymerized polyester resin. Further, pyrolysis and side reactions are inhibited during the esterification reaction and/or the ester exchange reaction and the polycondensation reaction so that the color stability and flame resistance to the finally polymerized polyester resin are improved.

DETAILED DESCRIPTION OF THE INVENTION

A more complete appreciation of the invention, and many of the attendant advantages thereof, will be better appreciated by reference to the following detailed description.

A method for preparing a polyester resin according to the present invention comprises the steps of carrying out an esterification reaction or an ester exchange reaction of a diacid component and a diol component in the presence of phosphoric acid derivatives, and carrying out a polycondensation reaction for reaction product of the esterification and/or ester exchange reaction. Therefore the method can increase the activity of an esterification reaction or an ester exchange reaction so that the reaction time is reduced, and the remaining rate of the secondary and/or the tertiary diol which have weak reactivity in the main chain of the polyester resin is increased, and the flame resistance and color stability of the polyester resin are improved.

The reactivity is related to activation energy of an esterification reaction and/or an ester exchange reaction between a diacid component and a diol component, and also related to response rate of diol component in a competition reaction of diol component which is exceeded generally. The remaining rate is the content of component (monomer) contained in final polyester resin after polymerization with respect to the input of each component (monomer). The reaction time is the time for an esterification reaction and/or an ester exchange reaction, wherein a start point is the moment of adding a diacid component and a diol component and a termination point is the moment of drain of byproduct such as water and alcohol by 80% of theoretical amount out of the system.

The color stability is the character which makes the color of final polymer colorless or white by inhibiting the generation of colorbody or inhibiting side reaction by controlling the activity of catalyst. The colorbody is generated from reverse reaction or decomposition reaction where molecular chains are shorten by heat for an esterification reaction and/or an ester exchange reaction and polycondensation reaction, additional reaction heat, frictional heat from stirring, and so on. Conventionally a stabilizer is used to increase the color stability, which absorbs the radical generated during a reaction or inhibits side reactions by catalysts. Organic/inorganic additives to change colors may be added for the aimed color of polymer.

Phosphoric acid derivatives used in the present invention is selected from a group consisting of compounds represented by the following Formulas 1 to 3 and mixture thereof.

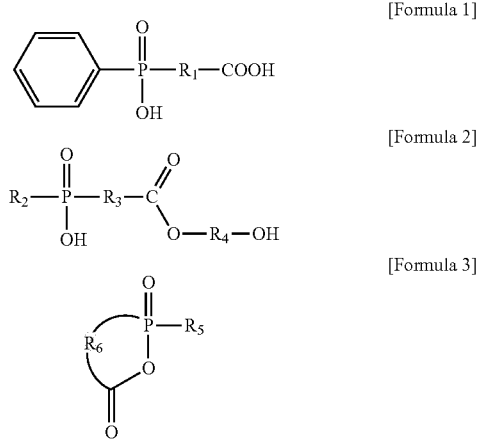

[Formula 1]
[Formula 2]
[Formula 3]

In Formula 1, $R_1$ is a linear, branched, mono-cyclic or multi-cyclic saturated or unsaturated hydrocarbon group of 0 to 10, preferably 1 to 6, more preferably 1 to 4 carbon atoms. In Formula 2, $R_2$ is a hydrogen atom or a linear saturated or unsaturated hydrocarbon group of 1 to 10, preferably 1 to 6, more preferably 1 to 4 carbon atoms, $R_3$ and $R_4$ are independently a linear, branched, mono-cyclic or multi-cyclic saturated or unsaturated hydrocarbon group of 1 to 10, preferably 1 to 6, more preferably 1 to 4 carbon atoms. In Formula 3, $R_5$ is a linear, branched, mono-cyclic or multi-cyclic saturated or unsaturated hydrocarbon group of 1 to 10, preferably 1 to 6, more preferably 1 to 4 carbon atoms, and $R_6$ is a saturated or unsaturated hydrocarbon group of 1 to 10, preferably 1 to 6, more preferably 1 to 4 carbon atoms.

An input of the phosphoric acid derivatives is 0.001 to 2 parts by weight, preferably 0.01 to 1 parts by weight, more preferably 0.05 to 0.5 parts by weight with respect to 100 parts by weight of the diacid component. If the input of the phosphoric acid derivatives is less than 0.001 part by weight, the above-mentioned enhanced effects of the reactivity and the flame resistance and the color stability of the polyester resin might not be appeared, and if the input of the phosphoric acid derivatives is more than 2 part by weight, the reaction time becomes longer, and the color stability might decrease.

The diacid component used in the present invention is the compound with two carboxylic acids (—COOH) or ester derivatives thereof. Diacid components used for conventional polymerization of polyester resin can be used widely. For example, a dicarboxylic acid such as terephthalic acid, isophthalic acid, 1,4-cyclohexanedicarboxylic acid, 1,3-cyclohexanedicarboxylic acid, succinic acid, glutaric acid, adipic acid, sebacic acid, 2,6-naphthalenedicarboxylic acid, and so on, and an ester derivative such as dimethylterephthalate, biphenyl dimethyldicarboxylate, and so on can be used in a single or mixed form. The ester derivative is formed by replacing the carboxyl group (—COOH) of a dicarboxylic acid with alkylester group (—COOR, R is alkyl group of 1 to 4 carbon atoms), and does an ester exchange reaction with a diol component to participates in the polymerization.

The diol component used in the present invention is a compound with two alcohol groups (—OH). As the diol component, a primary diol only or a mixture of a primary diol and a secondary and/or a tertiary diol, can be used in the polymerization of a polyester resin. Wherein, the primary diol is a compound with two alcohol groups, which has a form of linkage between a carbon atom bonded with alcohol group and another carbon atom. As the primary diol used in the polymerization of the polyester resin of the present invention, conventional primary diol components can be used widely. Examples of primary diol components include ethylene glycol (EG), 1,4-cyclohexanedimethanol, 1,3-propanediol, 1,4-butanediol, 2,2-dimethyl-1,3-propanediol, 1,6-hexanediol, 1,2-cyclohexanedimethanol, 1,3-cyclohexanedimethanol, and so on. Preferably, ethylene glycol, 1,4-cyclohexanedimethanol or the mixture of ethylene glycol and 1,4-cyclohexanedimethanol can be used as the diol component.

The input of the primary diol is 1 to 200 parts by mole, preferably 10 to 150 parts by mole with respect to 100 parts by mole of the diacid component. If the input of the primary diol is less than 1 part by mole, the final degree of polymerization might be reduced because of insufficient esterification reaction and/or ester exchange reaction, and if the input of the primary diol is more than 200 parts by mole, there are no specific advantages, and the polymerization reaction time is getting longer.

The secondary diol is a compound with two alcohol groups, which has a form of linkage between carbon atom bonded with alcohol group and other two carbon atoms. As the secondary diol used in the polymerization of the polyester resin of the present invention, conventional secondary diol components can be used widely. Examples of the secondary diol components include 1,2-propanediol, 1,2-cyclohexanediol, 1,4-cyclohexanediol, isosorbide, 2,2,4,4-tetramethylcyclo-1,3-butanediol, and so on. The tertiary diol is a compound with two alcohol groups, which has a form of linkage between carbon atom bonded with alcohol group and other three carbon atoms. As the tertiary diol used in the polymerization of the polyester resin of the present invention, conventional tertiary diol components can be used widely. For example, bisphenol-A, and so on can be used.

The secondary and/or the tertiary diol used in the present invention is preferably selected from a group consisting of isosorbide, 2-propyleneglycol(1,2-propanediol), 2,2,4,4-tetramethylcyclo-1,3-butane diol, bisphenol-A and mixture thereof. The input of the secondary and/or the tertiary diol is 0 to 200 parts by mole, preferably 1 to 140 parts by mole, more preferably 10 to 70 parts by mole with respect to 100 parts by mole of the diacid component. If the input of the secondary and/or tertiary diol is more than 200 parts by mole, there is no specific advantage, and the polymerization reaction time is getting longer.

Generally, the reactivity and reaction rate of a primary diol is higher than a secondary and a tertiary diol for the reason that a primary diol has lower steric hinderance than a secondary and a tertiary diol, and the reactivity and reaction rate of a secondary diol is higher than a tertiary diol for the same reason.

A method for preparing a polyester resin according to the present invention is carried out by two steps. The first is the step of producing the product of an esterification reaction and/or an ester exchange reaction such as diglycolester (for example, bis-β-hydroxyethylterephtalate (BHT)) of 1 to 15-mer by removing byproducts (water or alkanol) of an esterification reaction and/or an ester exchange reaction of a diacid component and a diol component out of the system, in the presence of the phosphoric acid derivatives. And the second is the step of polycondensation of the product of the esterification reaction and/or the ester exchange reaction at high temperature and high vacuum. The polycondensation which is called a exchange esterification reaction is carried out by a ester exchange and diol removing reaction, and has higher activation energy than the reaction of the first step so that it needs catalyst such as antimony and zinc. And the reaction is carried out at high temperature and high vacuum because of the melting point of the polymerized polyester and for eliminating the diol out of the system.

The molar ratio of diol component to diacid component used for the preparation of the polyester resin is related to the degree of polymerization, molecular weight, which is getting higher as the ratio is closed to 1. But the first reaction is generally carried out with excess diol component by 1.05 to 2.2 molar ratio of diol component to diacid component, and in the second step, the polymerization is carried out by raising molecular weight by draining the excess diol out of the system. Over certain temperature, excess diol components participate, with competing with different diol components, in the esterification reaction and/or the ester exchange reaction with diacid component. The reaction rate is connected with the reactivity of each diol and is related to the boiling point and the remaining rate of each diol in the succeeding polycondensation reaction at the high vacuum.

Hereinafter, the following examples are provided to illustrate the present invention in more detail, but the present invention is not restricted or limited by the following examples.

Example 1

Preparation of Polyester Resin 100 g (0.6 mol) of terephthalic acid (TPA), 55 g (0.886 mol) of ethylene glycol (EG) and 0.24 g (0.001 mol) of (2-carboxylethyl)phenylphosphinic acid (Formula 1, $R_1$=—$CH_2CH_2$—) as phosphoric acid derivatives were added into a reactor and mixed, and heated slowly until 250, and then water or methanol as byproduct was drained up to 80% of theoretical amount. Thereafter, germanium oxide ($GeO_2$) was added as a polycondensation catalyst, and the vacuum reaction was carried out for 3 hours at 275. The polyester resin whose intrinsic viscosity is 0.60 dL/g and more and number average molecular weight is 20,000~30,000, was obtained. The characteristics of the polyester resin are set forth in the following Table 1.

Example 2

Preparation of Polyester Resin

Except for using 0.48 g (0.002 mol) of phosphoric acid derivatives instead of using 0.24 g (0.001 mol) of phosphoric acid derivatives, the polyester resin whose the intrinsic viscosity is 0.60 dL/g and more and the number average molecular weight is 20,000~30,000 was obtained according to the same manner of the above stated Example 1. The characteristics of the polyester resin are set forth in the following Table 1.

Example 3

Preparation of Polyester Resin

Except for using 117 g (0.6 mol) of dimethylterephthalate (DMT) instead of using 100 g (0.6 mol) of terephthalic acid (TPA), and using 65 g (1.047 mol) of ethylene glycol (EG) instead of using 55 g (0.886 mol) of ethylene glycol (EG), the polyester resin whose the intrinsic viscosity is 0.60 dL/g and more and the number average molecular weight is 20,000~30,000 was obtained according to the same manner of the above stated Example 1. The characteristics of the polyester resin are set forth in the following Table 1.

Example 4

Preparation of Polyester Resin

Except for further adding 16 g (0.109 mol) of isosorbide (ISB), the polyester resin whose the intrinsic viscosity is 0.60 dL/g and more and the number average molecular weight is 20,000~30,000 was obtained according to the same manner of the above stated Example 1. The characteristics of the polyester resin are set forth in the following Table 1.

Example 5

Preparation of Polyester Resin

Except for using 0.48 g (0.002 mol) of phosphoric acid derivatives, instead of using 0.24 g (0.001 mol) of phosphoric acid derivatives, and further adding 16 g (0.109 mol) of isosorbide (ISB), the polyester resin whose the intrinsic viscosity is 0.60 dL/g and more and the number average molecular weight is 20,000~30,000 was obtained according to the same manner of the above stated Example 1. The characteristics of the polyester resin are set forth in the following Table 1.

Example 6

Preparation of Polyester Resin

Except for using 117 g (0.6 mol) of dimethylterephthalate (DMT) instead of using 100 g (0.6 mol) of terephthalic acid (TPA), and using 65 g (1.047 mol) of ethylene glycol (EG) instead of using 55 g (0.886 mol) of ethylene glycol (EG), and further adding 16 g (0.109 mol) of isosorbide (ISB), the polyester resin whose the intrinsic viscosity is 0.60 dL/g and more and the number average molecular weight is 20,000~30,000 was obtained according to the same manner of the above stated Example 1. The characteristics of the polyester resin are set forth in the following Table 1.

Comparative Example 1

Preparation of Polyester Resin

Except for not using phosphoric acid derivatives, the polyester resin whose the intrinsic viscosity is 0.60 dL/g and more and the number average molecular weight is 20,000~30,000 was obtained according to the same manner of the above stated Example 1. The characteristics of the polyester resin are set forth in the following Table 1.

Comparative Example 2

Preparation of Polyester Resin

Except for not using phosphoric acid derivatives, the polyester resin whose the intrinsic viscosity is 0.60 dL/g and more and the number average molecular weight is 20,000~30,000 was obtained according to the same manner of the above stated Example 3. The characteristics of the polyester resin are set forth in the following Table 1.

Comparative Example 3

Preparation of Polyester Resin

Except for not using phosphoric acid derivatives, the polyester resin whose the intrinsic viscosity is 0.60 dL/g and more and the number average molecular weight is 20,000~30,000 was obtained according to the same manner of the above stated Example 4. The characteristics of the polyester resin are set forth in the following Table 1.

Comparative Example 4

Preparation of Polyester Resin

Except for not using phosphoric acid derivatives, the polyester resin whose the intrinsic viscosity is 0.60 dL/g and more and the number average molecular weight is 20,000~30,000 was obtained according to the same manner of the above stated Example 6. The characteristics of the polyester resin are set forth in the following Table 1.

TABLE 1

|  |  | Examples | | | | | | Comparative Example | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| components | TPA (weight ratio) | 100 | 100 | — | 100 | 100 | — | 100 | — | 100 | — |
|  | DMT (weight ratio) | — | — | 117 | — | — | 117 | — | 117 | — | 117 |
|  | EG (weight ratio) | 55 | 55 | 65 | 55 | 55 | 65 | 55 | 65 | 55 | 65 |
|  | ISB (weight ratio) | — | — | — | 16 | 16 | 16 | — | — | 16 | 16 |
|  | phosphoric acid derivatives (weight ratio) | 0.24 | 0.48 | 0.24 | 0.24 | 0.48 | 0.24 | — | — | — | — |
| characteristics | reaction time (min) | 245 | 232 | 244 | 293 | 280 | 281 | 297 | 332 | 348 | 356 |
|  | remaining rate of ISB (%) | — | — | — | 53 | 56 | 55 | — | — | 47 | 49 |
|  | Color-a/b (a/b) | 1.4/1.8 | 1.3/1.5 | 1.5/2.3 | 0.7/6.5 | 0.6/6.1 | 1.0/8.2 | 1.5/2.0 | 1.8/2.5 | 0.8/7.6 | 1.0/9.0 |
|  | flame resistance (sec.) | 34 | 35 | 32 | 32 | 33 | — | 32 | 32 | 30 | 31 |

In the Examples and Comparative Examples, the value of Color a, b was measured by colorimeter (Data Processor DP-400 for Chroma meter) produced by Konica Minolta Sensing, Inc. for evaluating the color stability. And the flame resistance was evaluated by measuring the burning time of samples using UL-94 method. As shown in Table 1, in the present invention (Examples), the flame resistance of the polyester resin prepared by using phosphoric acid derivatives of the present invention was improved, and color stability was advanced by approximating the value of color a, b to 0 as compared with Comparative Examples using no phosphoric acid derivatives at the same condition. And in the present invention, the remaining rate of the secondary or tertiary diol was increased by over 6% at the same condition, and the reaction time for esterification and ester exchange was getting shortened. Moreover, the similar result was obtained even in the case of using phosphoric acid derivatives of Formula 2 or 3 instead of phosphoric acid derivatives of Formula 1.

The invention claimed is:

1. A method for preparing a polyester resin comprising the steps of:
    carrying out an esterification reaction and/or an ester exchange reaction of a diacid component and a diol component in a presence of phosphoric acid derivatives selected from a group consisting of compounds represented by the following Formulas 1 to 3; and
    carrying out a polycondensation reaction for reaction product of the esterification and/or ester exchange reaction,

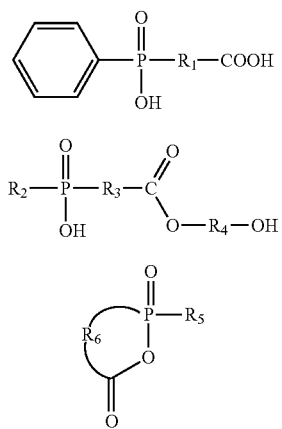

[Formula 1]

[Formula 2]

[Formula 3]

in Formula 1, $R_1$ is a linear, branched, mono-cyclic or multi-cyclic saturated or unsaturated hydrocarbon group of 0 to 10 carbon atoms, in Formula 2, $R_2$ is a hydrogen atom or a linear saturated or unsaturated hydrocarbon group of 1 to 10 carbon atoms, $R_3$ and $R_4$ are independently a linear, branched, mono-cyclic or multi-cyclic saturated or unsaturated hydrocarbon group of 1 to 10 carbon atoms, in Formula 3, $R_5$ is a linear, branched, mono-cyclic or multi-cyclic saturated or unsaturated hydrocarbon group of 1 to 10 carbon atoms, and $R_6$ is a saturated or unsaturated hydrocarbon group of 1 to 10 carbon atoms,
    wherein the diol component comprises a primary diol and isosorbide, the input of the primary diol is 1 to 200 parts by mole, the input of isosorbide is 10 to 70 parts by mole with respect to 100 parts by mole of the diacid component, and
    wherein a reaction time of the esterification reaction or the ester exchange reaction is reduced and the remaining rate of isosorbide in the main chain of the polyester resin is increased to be from 48 mole percent to 70 mole percent in comparison to polymer prepared without the phosphoric acid derivatives, and wherein the input of the phosphoric acid derivatives is 0.01 to 2 parts by weight with respect to 100 parts by weight of the diacid component.

2. The method for preparing polyester resin according to claim 1, wherein the input of the phosphoric acid derivatives is 0.01 to 0.5 parts by weight with respect to 100 parts by weight of the diacid component.

3. The method for preparing polyester resin according to claim 1, wherein the input of the phosphoric acid derivatives is 0.05 to 0.5 parts by weight with respect to 100 parts by weight of the diacid component.

* * * * *